R. D. TACKABERRY.
APPARATUS FOR HANDLING CLOTH AND OTHER SHEET MATERIAL.
APPLICATION FILED JUNE 17, 1920. RENEWED MAR. 10, 1922.
1,412,980.
Patented Apr. 18, 1922.
5 SHEETS—SHEET 2.
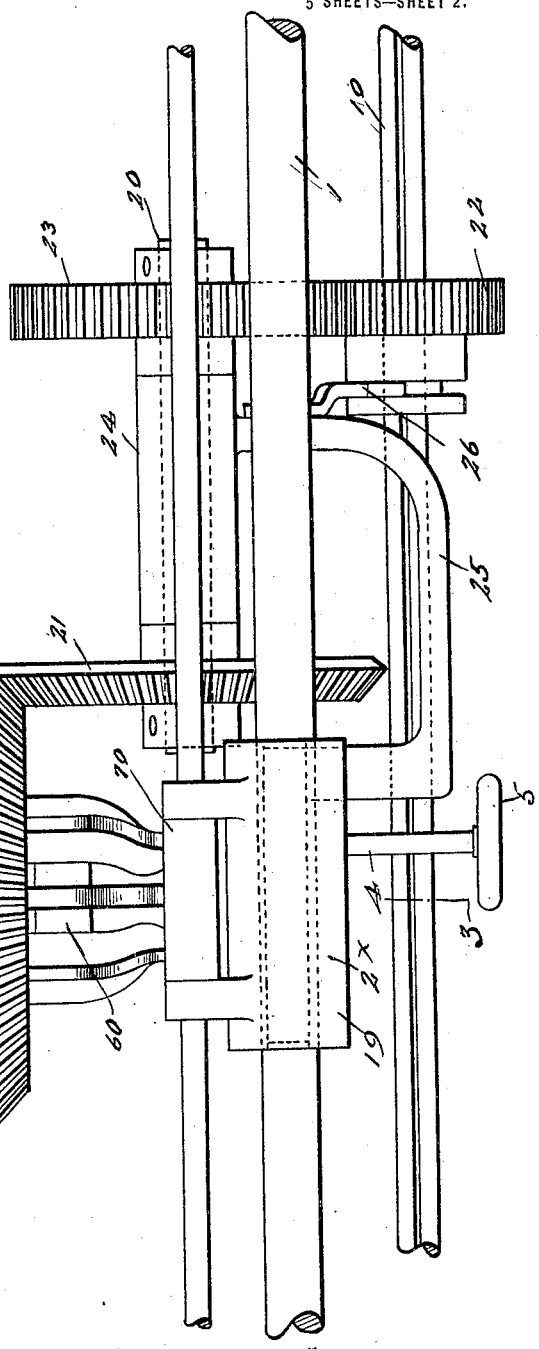
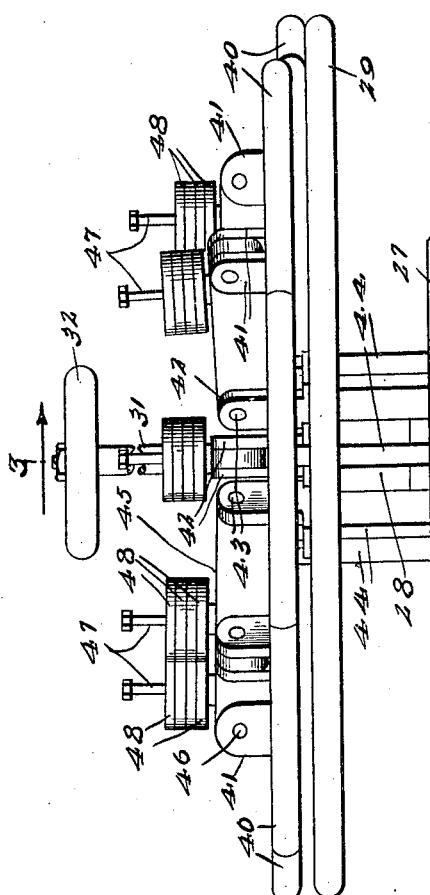
R. D. Tackaberry INVENTOR

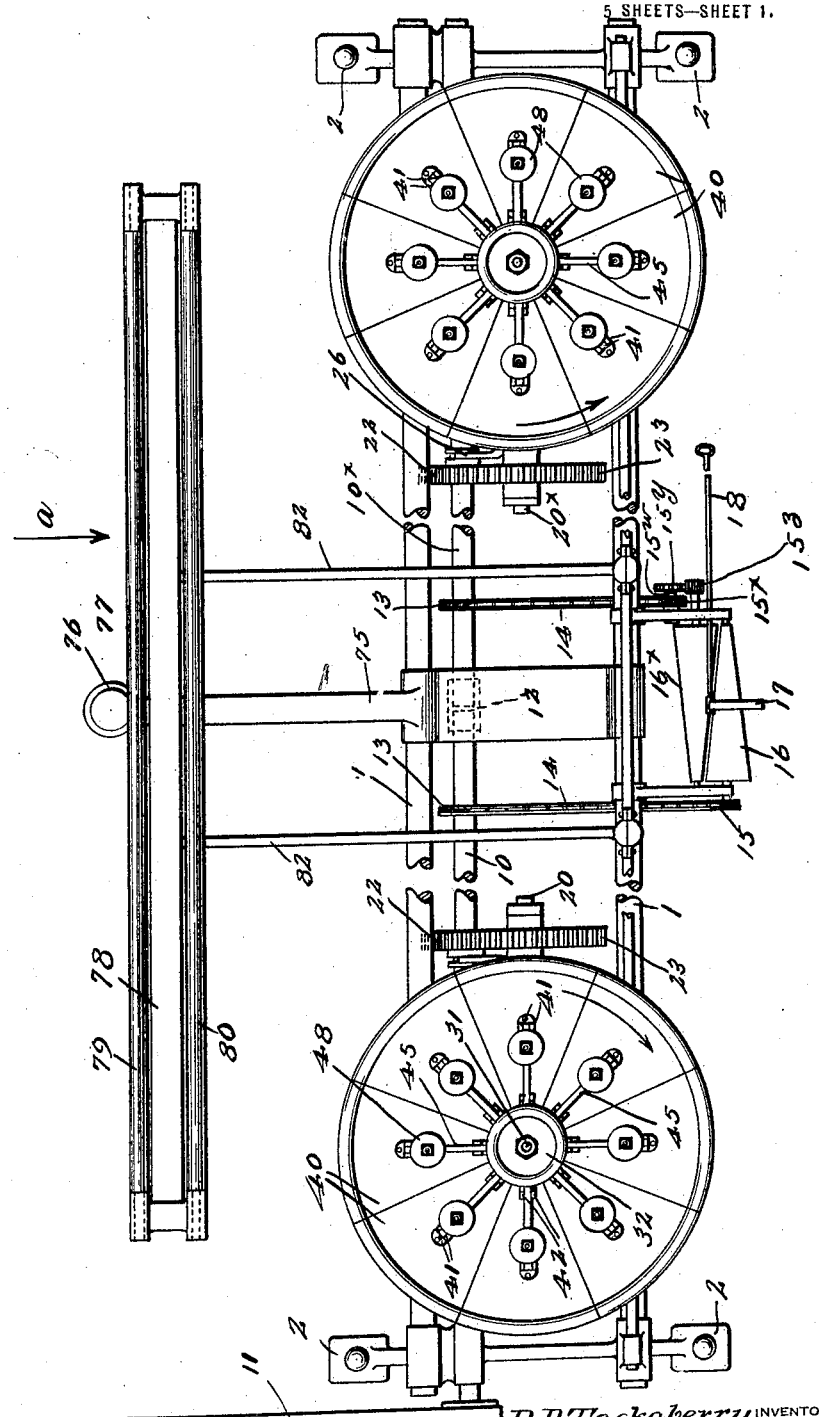
R. D. TACKABERRY.
APPARATUS FOR HANDLING CLOTH AND OTHER SHEET MATERIAL.
APPLICATION FILED JUNE 17, 1920. RENEWED MAR. 10, 1922.
1,412,980.
Patented Apr. 18, 1922.
5 SHEETS—SHEET 1.

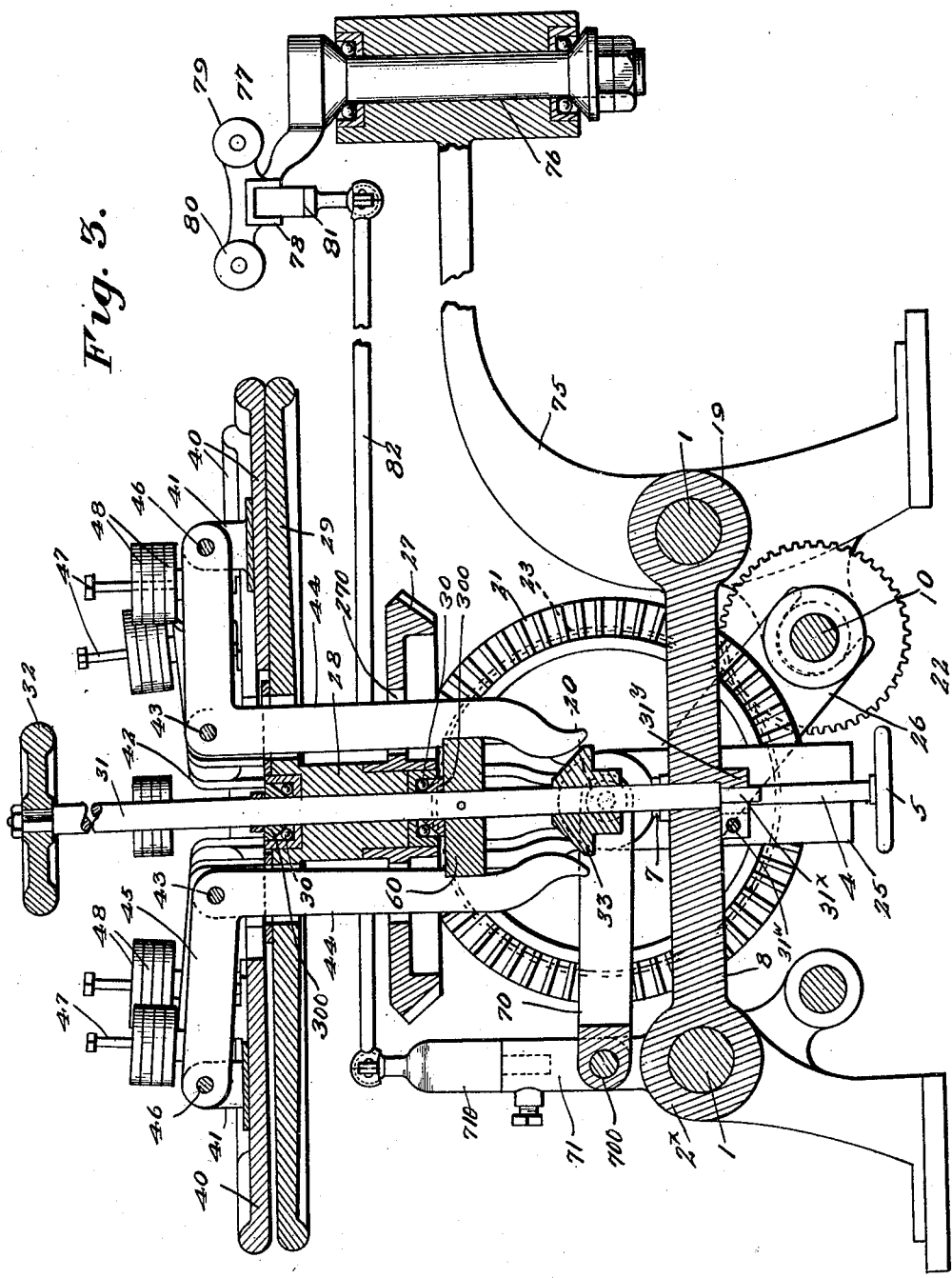

R. D. TACKABERRY.
APPARATUS FOR HANDLING CLOTH AND OTHER SHEET MATERIAL.
APPLICATION FILED JUNE 17, 1920. RENEWED MAR. 10, 1922.
1,412,980.
Patented Apr. 18, 1922.
5 SHEETS—SHEET 4.
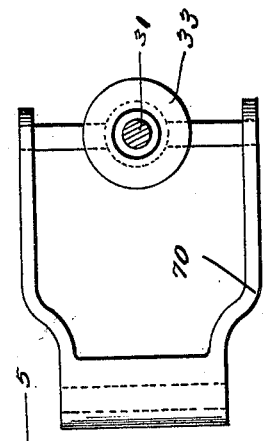
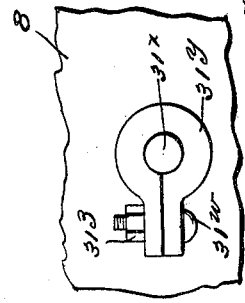
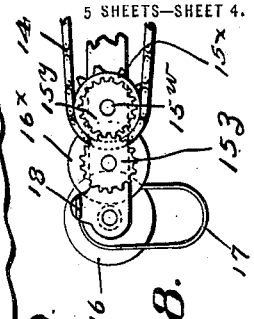
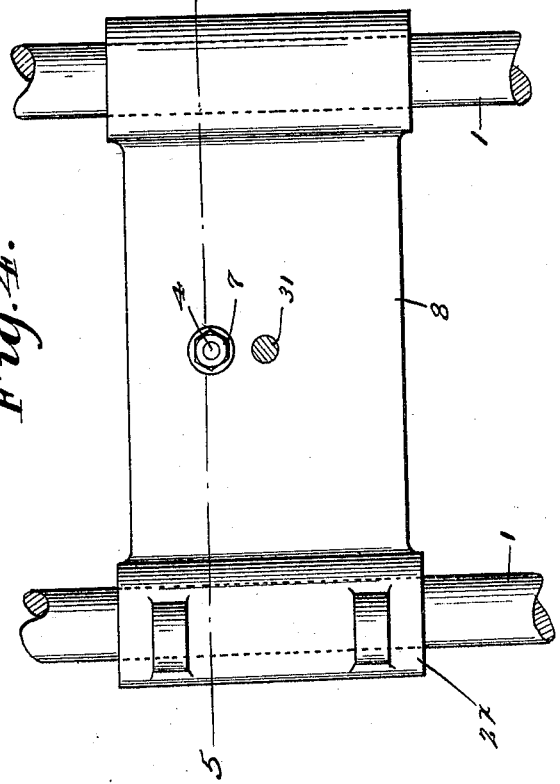
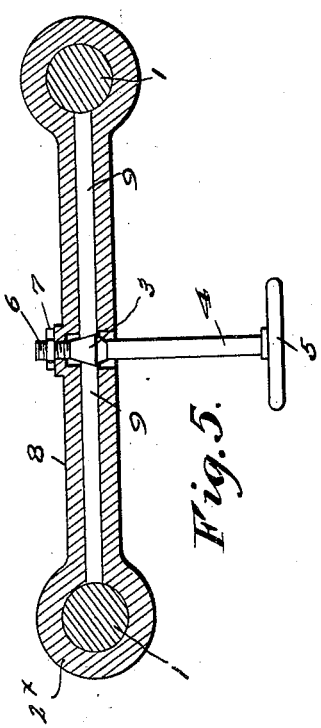
R. D. Tackaberry INVENTOR
BY Victor J. Evans
ATTORNEY
R. A. Thomas
WITNESSES R. D. TACKABERRY.
APPARATUS FOR HANDLING CLOTH AND OTHER SHEET MATERIAL.
APPLICATION FILED JUNE 17, 1920. RENEWED MAR. 10, 1922.

1,412,980.

Patented Apr. 18, 1922.
5 SHEETS—SHEET 5.

R. D. Tackaberry INVENTOR
BY Victor J. Evans
ATTORNEY

WITNESSES

UNITED STATES PATENT OFFICE.

ROBERT DANIEL TACKABERRY, OF LEWISTON, MAINE.

APPARATUS FOR HANDLING CLOTH AND OTHER SHEET MATERIAL.

1,412,980.  Specification of Letters Patent.  Patented Apr. 18, 1922.

Application filed June 17, 1920, Serial No. 389,738. Renewed March 10, 1922. Serial No. 542,783.

*To all whom it may concern:*

Be it known that I, ROBERT DANIEL TACKABERRY, a citizen of the United States, residing at Lewiston, in the county of Androscoggin and State of Maine, have invented new and useful Improvements in Apparatus for Handling Cloth and Other Sheet Material, of which the following is a specification.

One object of my present invention is the provision of an efficient apparatus susceptible of use to advantage in automatically guiding cloth and other sheet material into machines of various kinds, such as tentering machines, drying cylinders and the like.

Another object is the provision of an apparatus adapted to be used to advantage in stretching cloth and other sheet material in the direction of the width thereof.

Another object is the provision of an apparatus adapted to be manually controlled so that through the medium of the apparatus, cloth, at the will of the operator, may be pulled at one side edge to a greater extent than at the other side edge, with the result that the filling threads will be stretched—i. e., the filling threads will be caused to lie at right angles to the warp threads.

I prefer to construct the machine capable of being put to the uses stated in the manner hereinafter specifically described, but I do not desire to be understood as confining myself to such specific embodiment of the invention, inasmuch as there are certain important elements of the apparatus that are always included therein, irrespective of whether the apparatus is to be put to one or more than one of the uses stated.

To the attainment of the foregoing the invention consists in the improvement as hereinafter described and definitely claimed.

In the accompanying drawings, hereby made a part hereof:—

Figure 1 is a complete plan view of the apparatus constituting the best practical embodiment of my invention that I have as yet devised.

Figure 2 is an enlarged elevation showing one of the stands and all of the parts complementary thereto in elevation.

Figure 3 is a central, vertical transverse section taken diametrically through one of the stands on the line 3—3 of Figure 2, and showing certain parts thereof in elevation.

Figure 4 is a detail view, taken at right angles to Figures 2 and 3, and showing the carriage of a stand.

Figure 5 is a section on line 5—5 of Figure 4.

Figures 7, 8 and 9 are details hereinafter explicitly referred to.

Figure 10 is a detail view of a modification hereinafter explicitly referred to.

Similar numerals designate corresponding parts in Figures 1 to 10 to which reference will first be had.

Figure 6:
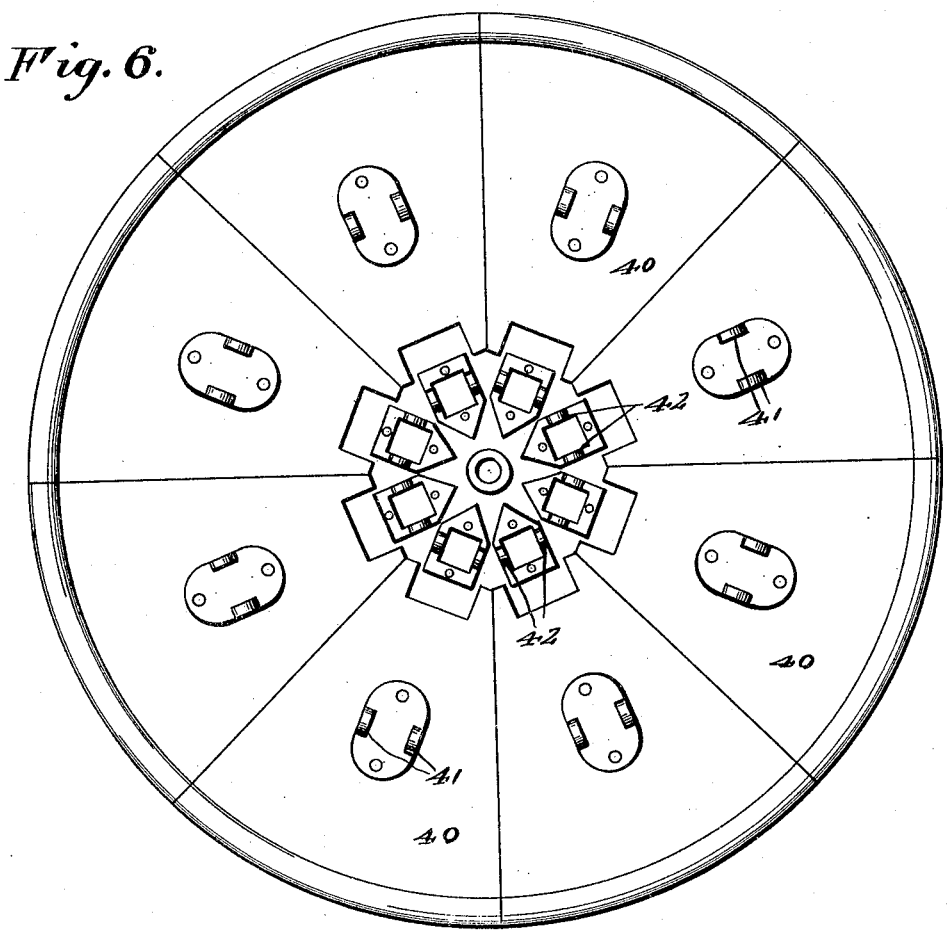
Figure 6 is a detail plan view of the upper sectional disk of one of the stands of the apparatus, with the tension bars and the weights thereon omitted.

In the carrying out of my invention, I employ two horizontal guide rods 1 arranged in parallelism, and I also employ two stands 2 which are spaced apart on a floor or other supporting surface, Figures 2, 3, 4 and 5, and are arranged to receive the guide rods 1, as clearly appears in Figures 1 and 3. At $2^x$ are carriages adjustable on the guide rods 1 toward and from each other to adapt the apparatus to the width of the cloth or other sheet material to be handled, and in order to adjustably fix each stand $2^x$ to the guide rods 1, I prefer to employ the mechanism best shown in Figure 5, which mechanism comprises a vertically adjustable cone 3, carried by a stem 4, equipped with a handle 5 and also equipped with a threaded end portion 6, above the cone, and a nut 7 mounted on the threaded portion 6. The cone and its stem are disposed in the portion 8 of the carriage $2^x$, and hence when the stem is turned to move the cone 3 upwardly, the cone will set pins 9 against the guide rods 1, and thereby adjustably fix the stand to the said guide rods. Through the medium of the nut 7 the cone may be secured in its upper position for the purpose stated. I also employ shafts 10 and $10^x$, Figure 1, that extend longitudinally of the apparatus. The shaft 10 is designed to be connected through the medium of a driving belt 11 or any other driving connection with the machine into which the cloth or other sheet material is to be fed. The contiguous ends of the shafts 10 and $10^x$ are adapted to freely turn independently of each other, and are preferably joined through the medium of a sleeve 12, shown by dotted lines in Figure 1, and each shaft is provided with a sprocket gear 13, connected to a sprocket belt 14. The structure belt 14 complementary to the shaft 10 is also connected to a sprocket gear 15 on the shaft of a cone 16. The sprocket belt 14 complementary to the shaft $10^x$ is connected to a sprocket gear $15^x$ on a stub shaft $15^w$, and the said stub shaft $15^w$ is provided with a spur gear $15^y$, Figures 1 and 8, which spur gear $15^y$ is intermeshed with a spur gear $15^z$ on the shaft of a cone $16^x$. The cones 16 and $16^x$ are reversely arranged, and are connected through the medium of a belt 17 that is adapted to be manually shifted through the medium of means, such as indicated by 18, so that, at the will of the operator, the shaft $10^x$ may be caused to rotate faster or slower than the continuously-driven shaft 10. Manifestly when the belt 17 is in neutral position, the shafts 10 and $10^x$ will be rotated at a uniform rate of speed.

20, $20^x$ are stub shafts each mounted in a bearing 24 on one of the carriages, Figures 2 and 3, and each provided with a miter gear 21. The shafts 20, $20^x$ are driven from the shaft sections 10, $10^x$ through the medium of spur gears 22 on the shafts 10, and $10^x$ and spur gears 23 on the shafts 20 and $20^x$; the bearings 24 being connected through the arms 25 with the carriages $2^x$, and being also connected at 26 to the gears 22 which are splined on the shafts 10 and $10^x$. Each of the miter gears 21 is intermeshed with a horizontally disposed miter gear 27, and each miter gear 27 is fixed with respect to a sleeve 28 on which is integral or appropriately fixed a horizontally disposed circular disk 29. It will be apparent from the foregoing that the disks 29 will be rotated about their axes through the medium of the driving connections described, from the shafts 10 and $10^x$; and it will also be apparent that when the shaft $10^x$ is driven faster than the shaft 10, the disk 29 connected with the shaft $10^x$ will be driven faster than the other disk 29.

The sleeve 28 of each disk 29 surrounds and is supported between ball bearings 30 opposed to cones 300 fixed to a shaft 31, having a handle 32 at its upper end, as best shown in Figure 3. Each shaft 31 is journaled at its lower end in one of the carriages $2^x$ and is provided with a lower reduced portion $31^x$, Figures 3 and 9. The said reduced portion $31^x$ is disposed in a friction clamp $31^y$, integral with the carriage $2^x$ and having arms connected together by a bolt $31^w$ and nut $31^z$. The said friction clamp serves to prevent too free manual turning of the shaft 31 and also to prevent casual turning of said shaft with the other turning parts. Fixed to each shaft 31 is a cam 60, Figure 3, disposed eccentrically to the shaft and adapted to be turned thereby, and vertically adjustable on the shaft 31 is a cone 33 adapted to be moved vertically by means independently of the shaft 31 as hereinafter set forth.

Arranged in a circular series above each disk 29, Figures 1, 3 and 6, is a plurality of sector-shaped gripping members 40, each of which is provided on its upper side with a pair of upstanding lugs 41. Within the circle described by the gripping members 40, the disk 29 is provided with a circular series of pairs of upstanding lugs 42, and between the lugs 42 of each pair tension bars 44 are pivoted, as indicated by 43. Each of these bars 44 is provided at its upper end with an outwardly reaching arm 45, and each arm 45 is pivotally connected at 46 to the lugs 41 of one gripping member 40. From this it follows that outward movement of the lower portion of each tension bar 44 will be attended by upward movement of the gripping member 40 connected with that bar 44, while inward movement of each tension bar 44 will be attended by gravitation of the gripping member 40 complementary to said bar. In order to increase the pressure that each gripping member 40 is adapted to exert on the cloth or other sheet material between it and the disk 29 below it, each arm 45 is preferably provided with an upwardly extending stem 47 on which weight disks 48 are removably arranged. It will be readily understood at this point that the weight of each gripping member 40 may be expeditiously and easily regulated by increasing or diminishing the number of the weight disks 48. It will also be noticed here that the tension bars 44 are arranged to extend downwardly through openings 270 in the miter gear 27, and are also adapted to swing outwardly and inwardly in said miter gear 27. This, however, is of no moment, inasmuch as the tension bars 44 and the miter gear 27 rotate together.

At this point it will be understood that the depending portions of the tension bars 44 are designed to be thrust outwardly by the cam 60 at a certain point in the rotation of the disk 29 unless at such time the said depending portions of the tension bars 44 have been moved outwardly by upward movement of the cone 33 before referred to. It will also be understood that outward movement of the depending arms of the tension bars 44 will be attended by raising of the gripping members 40 on the outwardly extending arms of said bars, while inward movement of the said depending portions of the tension bars will permit gravitation of the gripping members 40.

Manifestly, when the cam 60 is set to actuate the arms 44 and thrust the gripping members 40 downwardly as each of the said gripping members 40 is moving with its rotary disk 29 in a direction away from the longitudinal center of a piece of fabric moving on the disks 29 and between the two stands, the fabric will be stretched in the direction of the width thereof.

Figure 10:
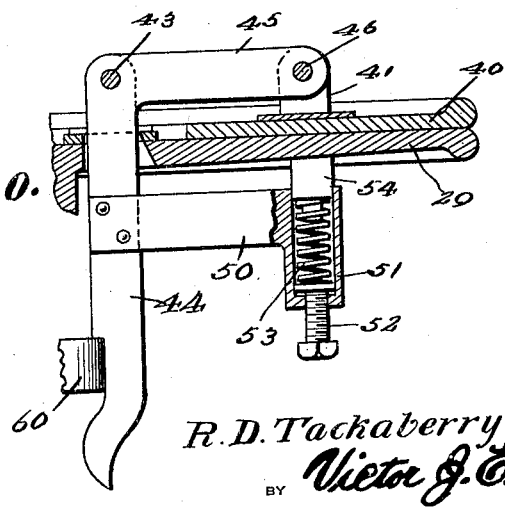

In lieu of providing weight disks 48 to lend increased weight to the gripping members 40, the tension bar 44 of each gripping member may be equipped as shown in Figure 10, with an outwardly extending arm 50. Said arm 50 is fixed to the tension bar 44 and is provided at its outer end with a housing 51 in the lower end of which is arranged to bear an adjusting screw 52. Superimposed on the said screw 52 is a spring 53, and guided in the upper portion of the housing 51, and thrust by the spring 53 against the under side of the disk 29, is a plunger 54. The said plunger 54, by pressing against the underside of the disk 29, serves to yieldingly press the gripping member 40 of the tension bar 44 downwardly. By adjusting the screw 52, the said yielding pressure may be readily increased or diminished at the will of the operator.

In the operation of the apparatus on very fine fabrics, thin muslin for instance, the operator will find it to be desirable to cover the upper sides of the disks 29 and the under sides of the gripping members 40 with clothing having a heavy pile, in order to afford yielding surfaces, or such surfaces may be afforded by bristles, it being understood that the longer the bristles, the smaller the amount of tension, and consequently there will be less rubbing motion against the cloth. Again, when heavy cloth is to be handled, it may be found necessary to cover the opposed surfaces of the disks 29 and gripping members 40 with inserted cork, and for still heavier fabrics, the said opposed surfaces may be corrugated in order to increase the frictional contact. I have not deemed it necessary to illustrate any of these friction-creating surfaces, inasmuch as it is within the purview of my invention to provide the disks 29 and the gripping members 40 with opposed surfaces adapted to take the place of or simulate the hands of a person when arranged to rub or pull cloth into place.

On each carriage 2ˣ is mounted to swing vertically a fork 70, Figures 3 and 7, the function of which is to raise the cone 33 complementary to the carriage. The said fork 70 is pivotally connected at 700, Figure 3, to an upstanding rocker or swing arm 71 on which is a swivelled head 710.

Mounted on the guide rods 1, midway between the carriages 2ˣ, is a bracket 75, Figures 1 and 3, and pivoted at its center to the said bracket 75, as indicated by 76, is a controller 77. The said controller 77 extends almost the full length of the apparatus, Figure 1, and includes a longitudinal bar 78 and rollers 79 and 80, arranged at opposite sides of the said bar 78, and so that they extend below the upper surface of the bar 78, Figure 3.

Interposed between pendent arms 81 on the controller at opposite sides of the center thereof, and at points remote from said center, and the rocker arms 71, are connecting rods 82.

In the practical operation of my novel apparatus as described, it will be understood that the cloth is passed in the direction indicated by arrow a in Figure 1, under the roller 79, over the bar 78 and under the roller 80 of the controller 77. The rollers 79 and 80 manifestly press the cloth downwardly upon the bar 78, and after passing under the roller 80, the side edge portions of the cloth are carried between the disks 29, on the one hand, and the gripping members 40 above said disks 29, on the other. If as the cloth slides over the bar 78 it is exactly on center, a uniform amount of friction will be exerted on the bar at the opposite sides of the center of movement thereof, and consequently the bar will remain parallel to a line extending through the centers of the two disks 29. In the event, however, of the cloth running off center to the right, the increased amount of cloth in contact with the right-hand arm of the bar 78 will give rise to a greater amount of friction on said right hand arm, and in consequence said arm will be moved forwardly toward the line extending through the center of movement of the disks 29, whereupon the right hand connecting rod 82 will be thrust forwardly, and at the same time the left hand connecting rod 82 will be retracted or moved rearwardly. On the forward movement of the right hand connecting rod 82, the right hand rocker or swing arm 71 will be swung forwardly, and in consequence the cone 33 complementary thereto will be raised, and said cone acting against the tension bars 44, will bring about the release of pressure on the particular gripping member 40 that is exerting pressure on the cloth at the right-hand side thereof. At this time the pressure of the gripping members 40 of the left hand stand of the apparatus on the cloth will be greater than that of the gripping members 40 of the right hand stand, and consequently the left hand edge portion of the cloth will be pulled forwardly, the balance of the friction on the controller 77 will be restored and the cloth will be pulled back to the central position.

At this point I would have it understood to accomplish the stretching of the cloth in the direction of its width, the speed of my apparatus is adjusted to the surface speed of the rolls of the machine to which the cloth is fed. This will be better understood when it is stated that if the disks 29 of my apparatus are revolving at a comparatively high rate of speed, the result will be a greater side wise movement or pull on the cloth, this because the disks 29 are revolved in opposite directions, and the faster they revolve, the greater is the tendency to pull the cloth sidewise and stretch the same. The pull sidewise on the cloth may be governed to a large extent by adjusting the weight disks or the springs hereinbefore described as complementary to the tension bars 44.

In order to utilize the apparatus for the purpose of straightening the filling threads in cloth that has passed through operations in a bleaching plant for instance, the belt shifter 18 is manually adjusted to increase the speed of the shaft $10^x$ as compared to the shaft 10. Thus when one disk 29 and its complementary gripping members 40 are driven faster than the other disk 29, the slow moving disk 29 will retard the side edge of the cloth on which the filling threads are in advance of their proper position, so that the cloth will be pulled forwardly at one side edge a little faster than at the other side edge, and in consequence the filling threads will be caused to reassume their proper positions at right angles to the warp threads.

By manually adjusting the cams 60 through the medium of the handles 32 and shafts 31, an attendant is manifestly enabled to control gravitation of the gripping members 40 at certain points in the rotation of the disks 29, and to raise the gripping members 40 at other points in said rotation as before pointed out in detail.

It will be readily appreciated from the foregoing that incidental to the operation of the apparatus as a straightener of the filling threads it may, at the same time, be functioning as a cloth guide and stretcher.

Having described my invention, what I claim and desire to secure by Letters-Patent, is:

1. Apparatus for handling cloth and other sheet material including spaced revoluble members between which the sheet material is carried and against which the edge portions of the sheet material are opposed, and flexible gripping members carried by the revoluble members and arranged to cooperate therewith in taking hold of the edge portions of the sheet material, in combination with a movable controller over which the sheet material is carried precedent to its engagement by the revoluble members, and movable means operable by movement of the controller to lessen the gripping action of the gripping members.

2. Apparatus for handling cloth and other sheet material including spaced revoluble members between which the sheet material is carried and against which the edge portions of the sheet material are opposed, and flexible gripping members carried by the revoluble members and arranged to cooperate therewith in taking hold of the edge portions of the sheet material, in combination with a movable controller over which the sheet material is carried precedent to its engagement by the revoluble members, and movable means operable by movement of the controller to lessen the gripping action of the said gripping members; the said controller being in the form of a lever fulcrumed at an intermediate point in its length, and the said movable means for lessening the gripping action of the gripping members being connected with the arms of the lever-like member.

3. Apparatus for handling cloth and other sheet material including revoluble devices having movable gripping means; the said devices being spaced apart to receive the sheet of material between them with the edge portions of the sheet subject to their gripping means, in combination with a movable controller, and movable connections between the controller and the gripping means of the respective revoluble devices to regulate the action of the gripping members thereof.

4. Apparatus for handling cloth and other sheet material including revoluble devices having movable gripping means; the said devices being spaced apart to receive the sheet of material between them with the edge portions of the sheet subject to their gripping means, in combination with means for driving the said devices, a movable controller, and movable means operable by the controller to lessen the gripping action of the gripping means of either device according to the movement of the controller.

5. Apparatus for handling cloth and other sheet material including revoluble devices having movable gripping means; the said devices being spaced apart to receive the sheet of material between them with the edge portions of the sheet subject to their gripping means, in combination with means for driving the said devices, means whereby the speed of one device may be increased as compared to that of the other, a movable controller, and movable means operable by the controller to lessen the gripping action of the gripping means of either device according to the direction of movement of the controller.

6. In an apparatus to guide cloth and other sheet material, the combination of spaced revoluble devices adapted for the passage of the material between them, with the edge portions of the material opposed to their faces, gripping members carried by and movable on the said devices, a lever-like controller, and movable means connected with the arms of the controller to raise the gripping members of one revoluble device on forward movement of the adjacent arm of the controller.

7. In an apparatus to guide cloth and other sheet material, the combination of spaced revoluble devices adapted for the passage of the material between them, with the edge portions of the material opposed to their faces, gripping members carried by and movable on the said devices, a lever-like controller, and movable means connected with the arms of the controller to raise the gripping members of one revoluble device on forward movement of the adjacent arm of the controller; the said controller comprising a bar, and rollers in parallelism to and arranged at opposite sides of the bar with their lower portions in a horizontal plane below the upper surface of the bar.

8. In a cloth handling apparatus, the combination of a revoluble disk, a circular series of independently movable gripping members hinged at their inner ends to said disk and disposed above the same, movable tension bars carried by the disk and connected with the gripping members, and having pendent arms grouped about the center of movement of the disk, means to yieldingly press the gripping members toward the face of the disk, and means arranged to cooperate with said pendent arms of the tension bars to raise the gripping members through the tension bars.

9. In a cloth handling apparatus, the combination of a revoluble disk, a circular series of independently movable gripping members hinged at their inner ends to said disk and disposed above the same, movable tension bars carried by the disk and connected with the gripping members, and having pendent arms grouped about the center of movement of the disk, means to yieldingly press the gripping members toward the face of the disk, a horizontally-adjustable eccentric cam, manual means to adjust said cam, said cam positioned within said group of pendent arms, and vertically-movable means arranged to cooperate with said pendent arms of the tension bars and through which the tension bars are moved and the gripping members raised.

10. Apparatus for handling cloth and other sheet material comprising spaced revoluble members between which the sheet material is carried and against which the edge portions of the sheet material are opposed, movable gripping members carried by the revoluble members and arranged to cooperate therewith in taking hold of the edge portions of the sheet material, and tension bars connected to said gripping members and having pendent arms grouped about the centers of movement of the revoluble members, in combination with movable cones disposed within the groups of pendent arms of the tension bars, a control lever, and connections between the arms of said lever and the cones to move the latter by the former.

11. Apparatus for handling cloth and other sheet material comprising spaced revoluble members between which the sheet material is carried and against which the edge portions of the sheet material are opposed, movable gripping members carried by the revoluble members and arranged to cooperate therewith in taking hold of the edge portions of the sheet material, and tension bars connected to said gripping members and having pendent arms grouped about the centers of movement of the revoluble members, in combination with movable cones disposed within the groups of pendent arms of the tension bars, a control lever, connections between the arms of said lever and the cones to move the latter by the former, and manually-adjustable cams disposed within the groups of pendent arms of the tension bars.

12. In an apparatus for handling cloth and other sheet material, the combination of a rotary disk, a gripping member connected with the said disk and arranged to cooperate therewith in taking hold of the edge portion of a piece of sheet material, a tension bar carried by the disk and having a pendent arm and also having a lateral auxiliary arm on said pendent arm and terminating in a housing, a plunger movable in said housing and opposed to the side of the disk remote from the gripping member, and a spring in the housing and exerting pressure against said plunger.

In testimony whereof I affix my signature.

ROBERT DANIEL TACKABERRY.